United States Patent [19]

Passarelli, Jr.

[11] 3,722,295
[45] Mar. 27, 1973

[54] MULTIPLE ROTATION GYROSCOPE WITH HYDRODYNAMIC SUSPENSION

[75] Inventor: William O. Passarelli, Jr., Jericho, N.Y.

[73] Assignee: Sperry Rand Corporation, New York, N.Y.

[22] Filed: Dec. 2, 1970

[21] Appl. No.: 97,466

[52] U.S. Cl. ........................... 74/5, 74/5.7
[51] Int. Cl. ........................... G01c 19/16
[58] Field of Search ............ 102/DIG. 3; 74/5, 5.42, 7

[56] References Cited

UNITED STATES PATENTS

| | | | |
|---|---|---|---|
| 3,365,958 | 1/1968 | Bard et al. | 74/5 |
| 3,048,043 | 8/1962 | Slater et al. | 74/5 |
| 3,522,737 | 8/1970 | Brenot | 74/5 |

Primary Examiner—Robert F. Stahl
Attorney—S. C. Yeaton

[57] ABSTRACT

A gyroscopic device having an inertial element that is hydrodynamically suspended within a centralized cavity of a gimbal rotating simultaneously about two mutually perpendicular axes in which the moment of inertia and angular velocity about the first axis is greater than the moment of inertia and angular velocity about the second axis. Synchronously applied decentralizing forces acting on the inertial element are resisted by additional bearing surfaces that combine with the component of rotation having the smaller angular velocity to increase the restoring force on the inertial element in the direction of the decentralizing forces thereby maintaining the inertial element centered within the gimbal.

6 Claims, 5 Drawing Figures

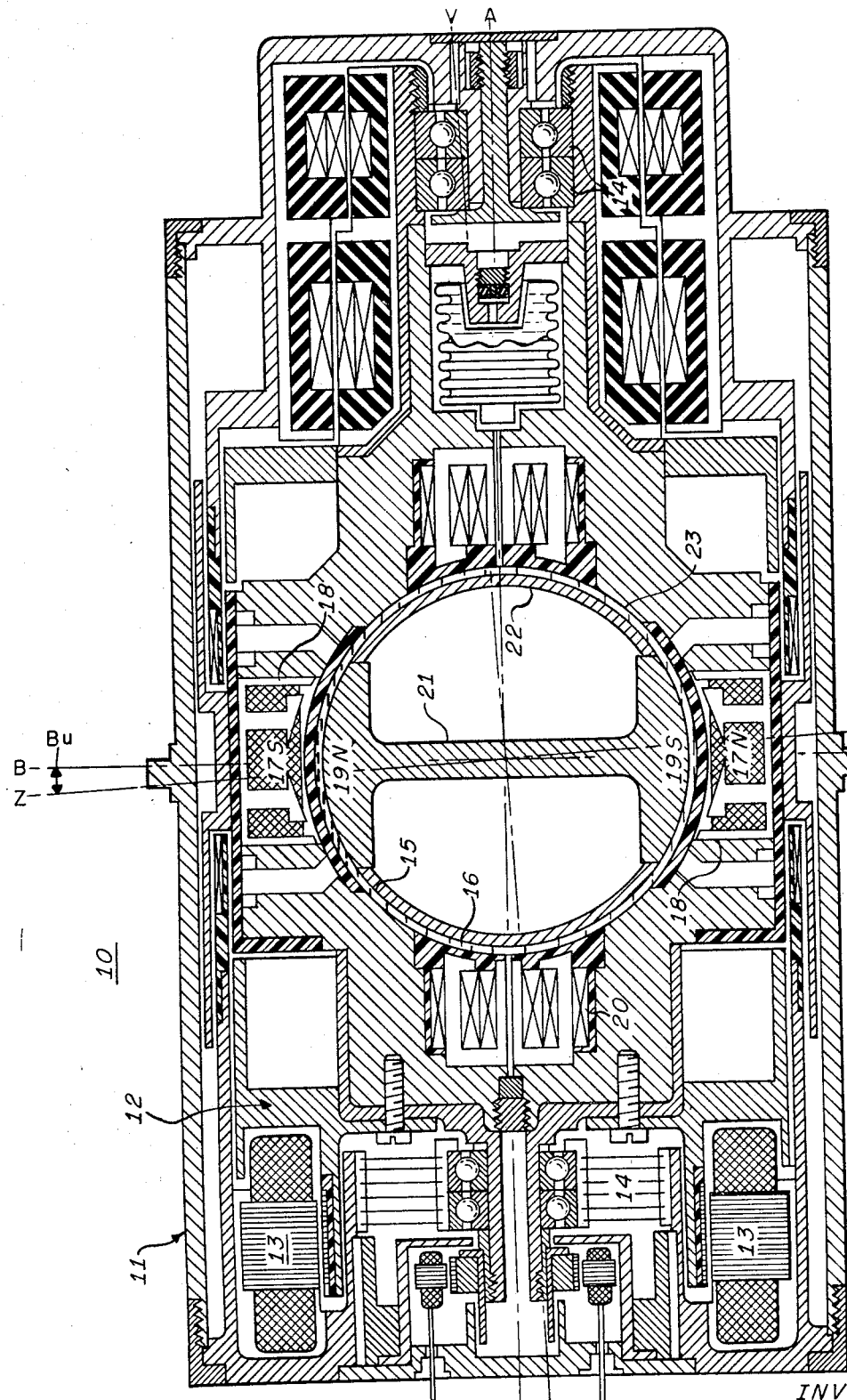

INVENTOR
WILLIAM O. PASSARELLI JR.
BY
ATTORNEY

MULTIPLE ROTATION GYROSCOPE WITH HYDRODYNAMIC SUSPENSION

BACKGROUND OF THE INVENTION

1. Field of the Invention

The present invention pertains to gyroscopic apparatus, particularly to such apparatus having an inertial element that is subjected to multiple rotation such as described in the copending U.S. Pat. application Ser. No. 392,676 entitled, "Multiple Rotation Gyroscope" invented by Albert D. Graefe, filed Aug. 25, 1964 and assigned to the assignee of the present invention, and is hydrodynamically suspended in a fluid contained within the gyroscope.

2. Description of the Prior Art

Prior art inertial elements have been supported by means of hydrostatic or hydrodynamic suspensions. However, auxiliary suspensions have been required during conditions of neutral or negative buoyancy to maintain the inertial element centered within the gimbal or similar structure in which the inertial element may be disposed. A number of techniques are available to provide this supplementary support including capacitive, eddy current, hydrostatic and inductive suspensions. All of these suspensions require additional components, and power sources thereby limiting the minimum physical size of the gyro. Further, the extra components pose additional design and reliability problems. For example, an auxiliary capacitive suspension requires capacitor plates, inductors, resistors, associated wiring, fluid region wire seals, a power supply, and a device such as a slip ring or a rotary transformer for transmitting the necessary excitation to the gyro's rotating structure. The instant invention requires no additional components or power sources other than those already present in the gyroscope.

SUMMARY OF THE INVENTION

An inertial element (angular momentum element) subjected to rotation about two mutually perpendicular axes and suspended in a relatively viscous fluid within a centralized cavity of a gimbal, rotates synchronously with the gimbal about the first axis at a higher angular velocity than about the second axis. The multiple rotation of the inertial element provides essentially two bearings each having a load carrying capacity. A primary bearing due to rotation of the inertial element about the fast spin axis produces a strong hydrodynamic centering force in the plane normal to the first axis, and a secondary bearing due to rotation about the slow spin axis produces a smaller hydrodynamic centering force in the plane normal to the second axis. Additionally, at temperatures below the neutral buoyancy temperature, centrifugal forces cause centering of the inertial element in the plane normal to the first axis. However, at neutral buoyancy, these centrifugal forces cease to exist and since the inertial element and rotor are rotating synchronously about the first axis, the primary bearing has no load capacity for synchronous loads. Therefore, an auxiliary means is required to resist translation along the second axis due to synchronous loads applied parallel to the axis of smaller angular velocity. In the present invention, a third bearing is provided through the addition of bearing surfaces to either the inertial element or the surface of the centralized cavity. These surfaces are comprised of profiled grooves spiraling out from the region of the poles of the slow rotation axis. These added bearing surfaces utilize the rotation of the inertial element having the smaller angular velocity to provide a sufficient restoring force to resist the decentering forces produced by the synchronous loads applied parallel to the axis of slow rotation and maintain the inertial element centered within the gimbal. This completely hydrodynamically suspended inertial element enables construction of a smaller, less expensive and more efficient gyroscopic apparatus.

BRIEF DESCRIPTION OF THE DRAWINGS

FIG. 1 is a cross-section diagram of a hydrodynamically suspended multiple rotation gyroscope.

DESCRIPTION OF THE PREFERRED EMBODIMENT

Figure 2A:
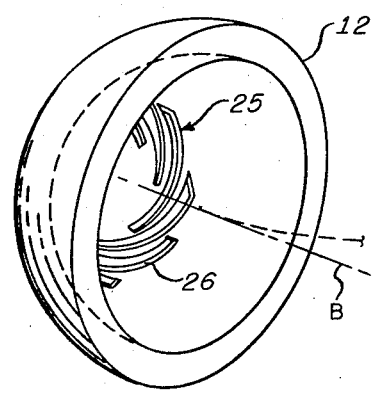
FIGS. 2a and 2b are diagrams of the inertial element showing curved grooves on the surface of the element about the horizontal axis, B.

The general operation of a multiple rotation gyroscope such as disclosed in the aforementioned copending U.S. application Ser. No. 393,676 will be described with reference to FIG. 1 as embodied in a 2° of freedom gyroscope. The gyroscope 10 has a case 11 within which a gimbal 12 is rotatably supported to spin at a fast rotation speed (for example, 6,000 rpm) about a gimbal axis A. The gimbal 12 supports a spherical shaped inertial element 15 within a cavity 23 which is spun at a slow rotation speed (for example, 60 rpm) with respect to the gimbal 12 about an inertial element axis Z which is almost perpendicular to the gimbal axis A. The inertial element 15 is also rotated in synchronism with the gimbal 12 about the inertial element axis V (at the high rotation speed) resulting in multiple rotation of the inertial element 15. The inertial element rotation axes Z and V are slightly displaced from the vertical gimbal axis A and a horizontal gimbal axis B.

The inertial element 15 is constructed so that its moment of inertia, $I_v$, about the fast rotation axis, V, is greater than its moment of inertia, $I_z$, about the slow rotation axis, Z. This is accomplished by having the major portion of the mass of the inertial element 15 concentrated at the extremities of the inertial element axis, Z. The multiple rotation of the inertial element 15 combines with the two different moments of inertia, $I_v$ and $I_z$, with respect to the inertial element axes, V and Z respectively, to produce highly stable operation and a reduction of the drift effects caused by any unbalances applied to the inertial element 15. To illustrate this latter point, consider an unbalancing mass applied to a point on the spherical inertial element 15 that is rotating about the two axes, V and Z, at two different rates. Since the point is moving with the inertial element 15, the point will trace a helical-like path after a number of rotations about the fast and slow axes, V and Z. The time average position of the mass will be only slightly decentered from the support center of the spherical inertial element 15, hence the resulting drift of the inertial element 15 will be very small.

During steady state operating conditions of the inertial element 15 will rotate at a slow angular velocity about the slow rotation axis, Z, and at a fast angular velocity about the fast rotation axis V. As shown in FIG. 1, the slow rotation axis Z is at an angle $B_u$ slightly displaced from the horizontal axis B of the encompassing gimbal 12. The angle, $B_u$, between axis Z and axis B may be expressed as a function of the angular velocities and the moments of inertia of the inertial element 15, as follows:

$$\sin B_u = \frac{1}{\left(\frac{I_v}{I_z} - 1\right)} \left(\frac{\Omega_w}{\Omega_F}\right)$$

wherein
$\Omega_w$ = angular velocity about the B axis
$I_v$ = moment of inertia about the B axis
$\Omega_F$ = angular velocity about the A axis
$I_z$ = moment of inertia about the A axis Stable operation of the inertial element 15 requires that the angle $B_u$ be minimized, and from the foregoing equation it follows that the Sin $B_u$ must be kept small. As mentioned previously, the moment of inertia, $I_v$, with respect to the fast rotation axis V is made greater than the moment of inertia, $I_z$, with respect to the slow rotation axis, Z. The reason for this difference is evident from the foregoing equation because by making $I_v$ greater than $I_z$ the denominator of the equation becomes significantly larger than the numerator and the resulting sin $B_u$ is very small, i.e., less than 1°. This satisfies the requirement that the angle, $B_u$, between the fast rotation axis Z and the horizontal gimbal axis B, must be small to achieve stable operation in steady state conditions. Further, as is well known in the gyroscopic art, stable operation is evident when an equilibrium condition is present, and an equilibrium condition is present when kinetic energy is a maximum. To determine if maximum kinetic energy is present, the foregoing equation may be expressed in terms of the derivative of kinetic energy with respect to the sin $B_u$ and equating the expression obtained to zero. Therefore:

$$[d(K.E.)]/[d(\operatorname{Sin} B_u)] = -(I_v - I_z)\, \Omega_F^2 \operatorname{Sin} B_u - I_z \Omega_F \Omega_w = 0$$

If the second derivative is obtained and is negative, then the kinetic energy will be a maximum; if it is positive, then the kinetic energy will be a minimum. Therefore:

$$[d^2(K.E.)]/[d^2(\operatorname{Sin} B_u)] = -(I_v - I_z)\, \Omega_F^2$$

The second derivative will be positive when $I_z$ is greater than $I_v$ indicating an unstable condition. However, in the subject device the inertial element 15 is designed so that $I_v$ is greater than $I_z$, therefore, kinetic energy is a maximum, equilibrium is present and the steady state condition will provide stable operation.

A more detailed description of the operation of the multiple rotation gyroscope is presented in copending U.S. application Ser. No. 392,676.

Referring again to FIG. 1, the 2° of freedom multiple rotation gyroscope 10 constructed in accordance with the present invention has a case 11 in which a gimbal 12 is rotatably supported and may be spun by drive motor 13 at a fast rotation speed with respect to the case 11 about the A axis. The gimbal 12 may be rotatable with respect to the case 11 by spaced ball bearings 14 or by other bearing means known in the art. The inertial element 15 is hydrodynamically supported by a fluid 16 within the cavity 23 of the gimbal 12. The fluid 16 may be a liquid consisting of a fluorocarbon such as FC-75. The ferro-magnetic poles 17 S and N of a pickoff-torquer 18 and the magnetic poles 19 N and S of the inertial element 15 tend to hold the inertial element 15 in synchronism with the gimbal 12 as the inertial element 15 spins about the V axis. Eddy current torque motors 20 rotate the inertial element 15 at a slow rotation speed with respect to the gimbal 12 about the Z axis.

The inertial element 15 may comprise a high density material such as a dumbbell-shaped magnet 21 fabricated of platinum cobalt disposed within a hollow low density metal sphere 22, the latter being fabricated of beryllium, for example.

The description of synchronous loading as applied to the inertial element 15 will now be described with reference to FIG. 1. In this description the axes of fast and slow rotation will be referred to as the A and B axes, respectively, it being understood from the foregoing remarks that the V and Z axes are substantially aligned to the A and B axes except for the slight angular displacement $B_u$. Assume the gyroscope is turned off, the temperature is relatively low and the inertial element 15 is floating at the top of the cavity 23 within the gimbal 12. When the gyroscope is turned on, the inertial element 15 will become centered within the cavity 23 because the flotation liquid at a low temperature is more dense than the inertial element 15 and the resulting centrifugal forces act upon the inertial element 15, cause it to become centered in the plane normal to the A, and centered in the cavity along axis A due to the hydrodynamic lift generated by the inertial element (15) rotating about axis B. As the temperature increases to exactly that required from neutral buoyancy, the inertial element 15 will remain centered, if the synchronous forces are balanced. Synchronous forces are forces acting on the inertial element 15 which spin in synchronism with the inertial element 15 and the gimbal 12 as they rotate about the A axis thereby causing the inertial element 15 to translate along the B axis toward the wall of the cavity 23 in the gimbal 12. Non-synchronous forces are forces which act on the inertial element 15 tending to decenter it, but are not in synchronism with the inertial element 15 and gimbal 12 as they rotate about the A axis. Non-synchronous forces are resisted by the increased hydrodynamic stiffness produced by the dynamic action of the inertial element 15 acting in combination with the flotation fluid 16 and the wall of the cavity 23 in the gimbal 12. As a result, any translation of the inertial element 15 along the A axis or an axis perpendicular to the A and B axes would result in a restoring force tending to center the inertial element 15.

The pick-off torquer ferro-magnetic poles 17 S and N and the rotor magnetic poles 19 S and N create magnetic forces which result in synchronous forces being applied to the inertial element 15. Since it is extremely difficult to maintain the magnetic force due to the magnetic poles 19 N and 17 S exactly equal to the magnetic force due to the magnetic poles 19 S and 17 N, an unbalance can easily occur.

Even when the inertial element 15 is positioned exactly in the center between the magnetic poles 17 S and 17 N and the net force difference is zero, once any dislocation of the inertial element 15 from exact center takes place, an unbalance will occur and the resulting forces will tend to decenter the inertial element 15. For example, a transient change in the buoyancy of the flotation fluid due to temperature variation can cause an unbalance in the zero net force difference between the magnetic poles 17 S and 17 N. The inertial element 15 in response to this unbalanced condition will translate along the B axis towards magnetic poles 17 N or 17 S. Since there is no restraining force along the B axis to counteract the unbalance in the magnetic forces, the inertial element 15 will continue to be displaced until it comes in contact with the wall of the cavity 23 in the gimbal 12. As a consequence, the inertial element 15 will no longer produce relative motion between the inertial element 15 and the gimbal 12 thereby causing the gyroscope to be inoperative.

Figure 2B:
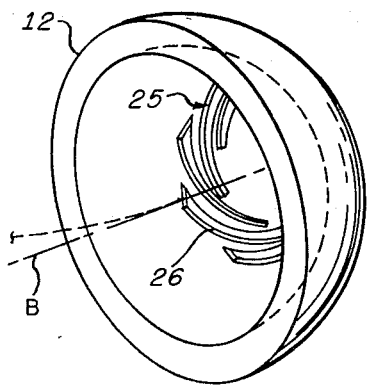

This deficiency in the hydrodynamically supported inertial element 15 is overcome in the present invention by additional bearing surfaces which produce sufficient hydrodynamic stiffness to provide a restraining force to synchronous loads applied parallel to the B axis. The specific purpose of the additional bearing surfaces is to form a built-in wedge action. There are many geometric shapes and forms available as possible choices for these surface features including step grooves, tapered wedges, curved ridges, herringbone, and spiral grooves. Present state of the art practical fabrication considerations narrows the possibilities to either step or spiral grooves and it has been theoretically established that the spiral groove bearing excels by a factor of 2:1 to 4:1 over the step bearing. Therefore, in a specific embodiment of the present invention spiral grooves were profiled on the walls of the spherical cavity 23 within the gimbal 12 as shown in FIG. 2. Eight spiral grooves 25 having a spiral angle of 65°, an outside diameter of 13/16 inches and an inside diameter of ½ inch were eroded in the spherical surface in the vicinity of the poles of the B axis. Other techniques may be used equally well to effect these grooves including etching and casting. The spherical diameter of the inertial element 15 was 1.250 inches and the radial clearance between the surface of the inertial element 15 and the wall of the cavity was 0.0011 inch. The ratio of the radial clearance to the groove depth was 1:1. For optimum performance the radial clearance should be of the same order of magnitude as the groove depth.

In a multiple rotation gyroscope incorporating the additional bearing surfaces, assume an unbalance in the zero net force difference between the magnetic poles 17 S and 17 N occurs, and the inertial element 15 translates toward the magnetic pole 17 S. Since the surface features provide built-in wedge action through the action of the surfaces 26 of the spiral grooves 25 acting on the flotation fluid 16, the restoring force will increase as the bearing gap decreases. The restoring force produced between the inertial element 15 and the wall of the cavity 23 within the gimbal 12 in the region of the magnetic pole 17 S will greatly increase. At the same time in the region of the magnetic pole 17 N the restoring force will decrease because the gap has increased. Therefore, the inertial element 15 responding to this difference in force will translate back along the B axis toward the center of the cavity 23. Any further displacement along the B axis will result in a similar increase in force acting on the surface of the inertial element 15 in a direction opposite to the displacement, thereby maintaining the inertial element 15 centered within the cavity of the gimbal 12.

Figure 3A:
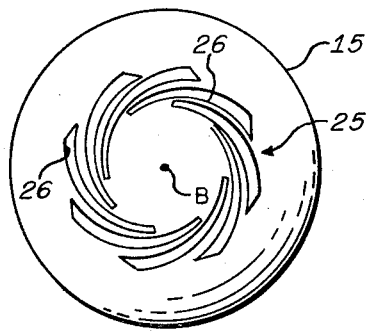
FIGS. 3a and 3b are isometric diagrams of the cavity showing curved grooves on the inner surface of the cavity about the horizontal axis, B.
Figure 3B:
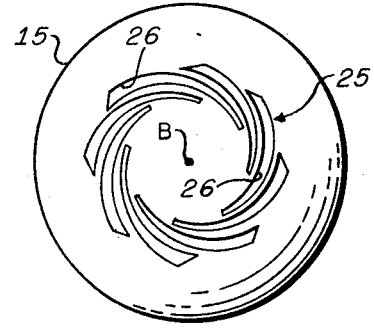

An alternative embodiment of the present invention is shown in FIG. 3. In this embodiment the additional bearing surfaces are provided by spiral grooves 25 profiled on the surface of the inertial element 15 in the region of the horizontal axis B.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. a gyroscopic apparatus comprising
an inertial element having first and second mutually perpendicular axes of inertial symmetry, said inertial element simultaneously rotating about said first and second axes and having a moment of inertia and angular velocity component about said first axis which is greater than its moment of inertia and angular velocity component about said second axis,
gimbal means for rotating about said first axis in synchronism with said inertial element including an internal cavity enclosing said inertial element,
first and second fluid bearing means disposed between said gimbal means and said inertial element for hydrodynamically suspending said inertial element in a centered position along said first and second axes within said cavity,
means mounted in said gimbal means for providing synchronous forces which act on said inertial element and spin in synchronism with said inertial element and said gimbal means as they rotate about said first axis, and
third fluid bearing means disposed between said gimbal means and said inertial element for providing restoring forces which compensate unbalanced conditions in said synchronous forces that decenter said inertial element along said second axis whereby said restoring forces translate said inertial element along said second axis to restore it to a centered position within said cavity.

2. A gyroscopic apparatus as defined in claim 1 in which said first and second fluid bearing means include a relatively viscous fluid disposed between the internal surfaces of said cavity and the external surfaces of said inertial element which co-acts with these surfaces in response to said simultaneous rotation of said inertial element about first and second axes, and
said third fluid bearing means includes additional surfaces between said internal surfaces of said cavity and said external surfaces of said inertial element which co-act with said relatively viscous fluid to provide said restoring forces.

3. A gyroscopic apparatus as defined in claim 2 in which said third fluid bearing means includes surface features profiled on the surface of said inertial element in the region of the poles of said second axis of rotation.

4. A gyroscopic apparatus as defined in claim 2 in which said third fluid bearing means includes surface features profiled on the walls of said cavity of said gimbal in the region of the poles of said second axis of rotation.

5. A gyroscopic apparatus as defined in claim 2 in which said third fluid bearing means includes spiral grooves profiled on the surface of said inertial element in the region of the poles of said second axis of rotation.

6. A gyroscopic apparatus as defined in claim 2 in which said third fluid bearing means includes spiral grooves profiled on the walls of said cavity of said gimbal in the region of the poles of said second axis of rotation.

* * * * *